United States Patent [19]

Hamann

[11] 4,174,529
[45] Nov. 13, 1979

[54] PROTECTIVE CIRCUIT FOR ZINC OXIDE VARISTORS

[75] Inventor: John R. Hamann, Richmond, Mass.

[73] Assignee: General Electric Company, N.Y.

[21] Appl. No.: 894,529

[22] Filed: Apr. 10, 1978

[51] Int. Cl.² .............................................. H02H 7/16
[52] U.S. Cl. .......................................... 361/16; 361/57
[58] Field of Search ................ 361/16, 15, 17, 57, 361/56, 54, 93, 94, 111, 110; 338/20, 21, 92, 277

[56] References Cited

U.S. PATENT DOCUMENTS

| 2,363,898 | 11/1944 | Partington | 361/16 |
| 3,319,121 | 5/1967 | Lee | 361/16 |
| 3,619,721 | 11/1971 | Westendorp | 361/16 |
| 3,693,053 | 9/1972 | Anderson | 361/434 |
| 3,883,782 | 5/1975 | Beckwith | 361/57 |

FOREIGN PATENT DOCUMENTS 860307  1/1941  France ...................................... 361/16

Primary Examiner—Patrick R. Salce
Attorney, Agent, or Firm—Francis X. Doyle; Richard A. Menelly

[57] ABSTRACT

The invention provides a circuit for determining excessive energy magnitudes or rates of rise of energy in metal oxide varistor devices. The circuit further provides a series of low voltage control pulses for energizing a high voltage pulse generator. The output of the high voltage pulse generator triggers a protective air gap for bypassing the metal oxide varistor device. One application for the invention is for use within a series capacitor protective circuit.

21 Claims, 4 Drawing Figures

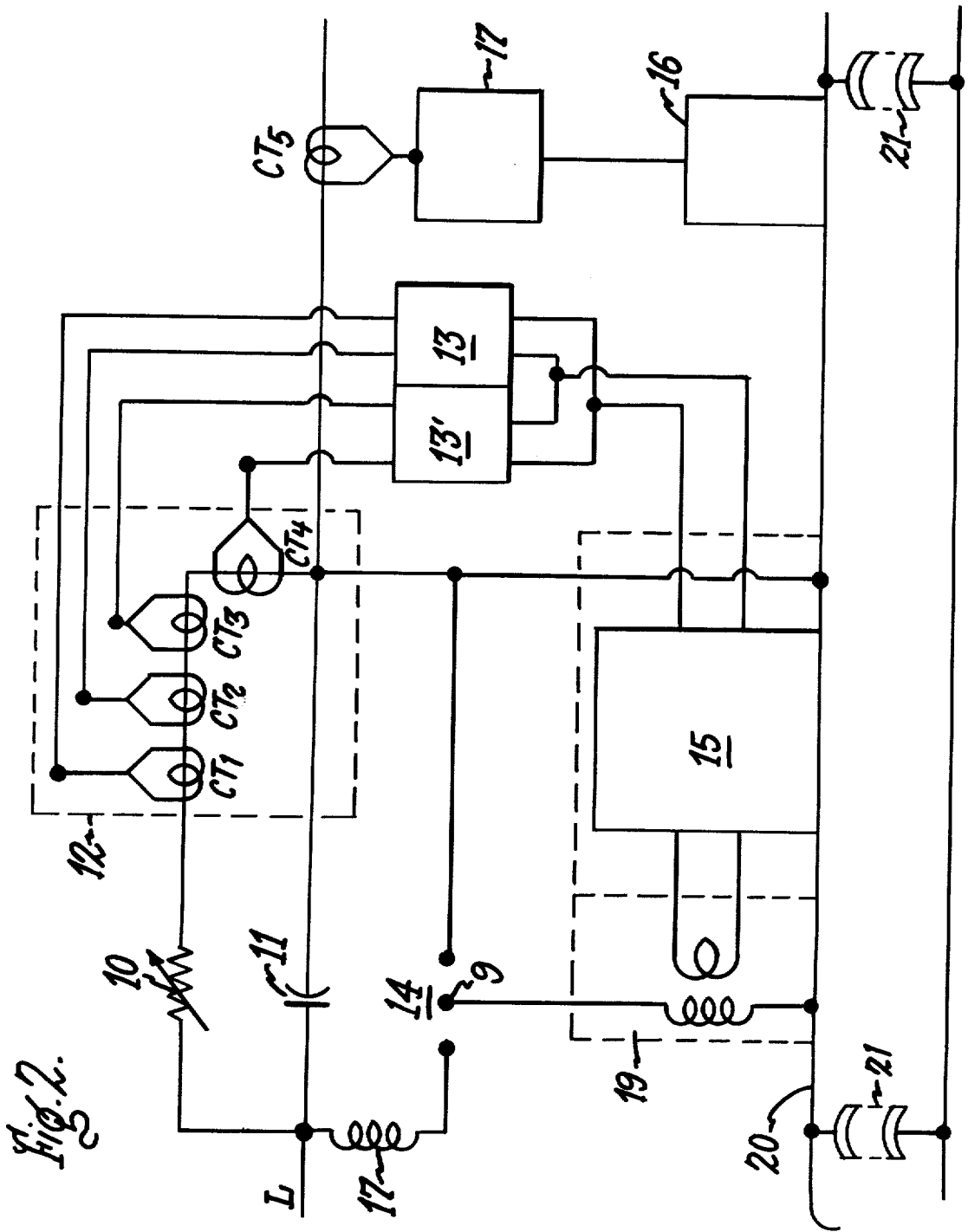

4,174,529

PROTECTIVE CIRCUIT FOR ZINC OXIDE VARISTORS

BACKGROUND OF THE INVENTION

Series capacitor protective equipment can employ a non-linear zinc oxide varistor to limit the magnitude of the voltage across the protected series capacitor. Under normal operating conditions load currents flow through the series capacitor such that the voltage across the capacitor is the product of the load current and the capacitive reactance. The voltage withstand of the capacitor is selected such that the capacitor voltage caused by the flow of load current is well within the voltage withstand capability of the capacitor. The varistor characteristic is selected such that under normal load current conditions the varistor current is limited to a few milliamperes. When a fault condition, for example a line to ground fault, occurs on the transmission line in which the series capacitor is connected to current through the capacitor increases. The current increase causes the capacitor voltage to increase and if the capacitor voltage is sufficiently high its voltage withstand capability is exceeded. To prevent the occurrence of excess voltage across the capacitor the zinc oxide varistor provides an alternative path for the fault current causing the excess capacitor voltage. However the current flow through the zinc oxide varistor during line fault conditions may cause damage to the varistor if allowed to continue for prolonged periods of time. Because excessive energy is dissipated in the varistors some means must be provided therefore for limiting the total energy dissipation within the varistor itself.

One means commonly employed to protect equipment from excess energy dissipation is the employment of a parallel air gap to bypass at least a part of the energy developed during a fault situation. One of the problems involved with the employment of triggered air gap devices is that a means must be provided to determine when the energy dissipated by the equipment becomes excessive. Another problem involved is to determine when the rate at which the energy is dissipated within the equipment becomes excessive. When the rate at which energy is dissipated in the equipment is too high the gap will not have sufficient time to operate before the equipment fails.

One of the purposes of this invention is to determine when the magnitude of rate of rise of energy dissipation is excessive and to provide low voltage pulses to initiate operation of a high voltage pulse generator for triggering an air gap when either of these conditions exist. A second purpose of the invention is to provide the low voltage initiating pulses at times when the voltage across the air gap is at or near its maximum value.

SUMMARY OF THE INVENTION

A current sensing device coupled with a combined thermal analog and low voltage pulse generator circuit generates low voltage pulses for initiating the operation of a high voltage pulse generator to trigger an air gap device.

The combined thermal analog and low voltage pulse generator circuit comprises a combination of current sensors and resistive elements coupled with a switching device driven by a voltage comparator. A voltage rectifier is used to charge a sensing capacitor for providing input to the voltage comparator.

BRIEF DESCRIPTION OF THE DRAWINGS

FIG. 2 is a detailed circuit representation of the series capacitor protective circuit of FIG. 1;

GENERAL DESCRIPTION OF THE INVENTION

Figure 1:
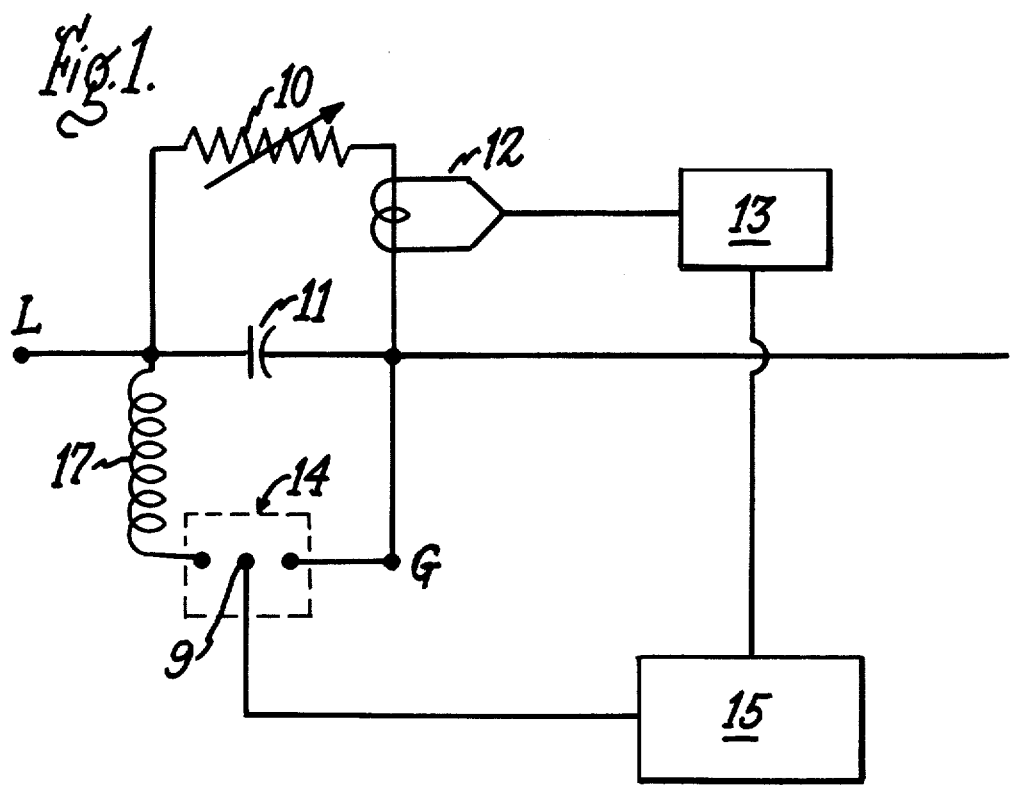
FIG. 1 is a block diagram representation of one type of a series capacitor protective circuit.

FIG. 1 shows a series capacitor protective circuit which is used for example for protecting the series capacitor of a power trasmission line. A metal oxide varistor 10 is electrically connected in parallel with the capacitor 11 in order to bypass current through capacitor 11 when the voltage across the capacitor is excessive. Excessive voltages develop, for example, when a line to ground fault occurs on the transmission line. A triggered air gap device 14 is electrically coupled in parallel with both the metal oxide varistor and the capacitor to bypass both the varistor and the capacitor when the magnitude or rate of energy dissipation within the varistor becomes excessive. An inductive element 17 is electrically connected in series with the air gap in order to limit the current through both the air gap and the capacitor when the air gap becomes conductive. A sensor device 12 is used to monitor the current through the varistor for providing input to a low voltage pulse generator, and thermal analog circuit 13. The combined low voltage pulse generator and thermal analog circuit is connected to a high voltage pulse generator 15 which in turn provides high voltage pulses to the triggered air gap 14. The series capacitor protective circuit is coupled to the transmission line at terminal L and also at common terminal G.

DESCRIPTION OF THE PREFERRED EMBODIMENT

FIG. 2 is a detailed illustration of the series capacitor protective circuit of the invention wherein the sensor circuit 12 includes a first current transformer $CT_1$ and a second current transformer $CT_2$ for monitoring the current through varistor 10 and for providing input to the thermal analog and low voltage pulse generator (TA) 13. A second pair of current sensors $CT_3$, $CT_4$, are provided for redundant operation of the sensor circuit and are connected with a second TA 13′. The first pair of current transformers $CT_1$, $CT_2$, in cooperation with TA 13 provide low voltage pulses on the positive portion of the varistor current wave and the second pair of current transformers $CT_3$, $CT_4$, in cooperation with the second TA 13′ provide low voltage pulses on the negative portion of the varistor current wave. The output from both TA 13, 13′ are coupled to the input of high voltage pulse generator 15. The high voltage pulse generator can consist for example, of two pulse forming networks which are discharged through two separate switching devices into one common pulse transformer 19. The output of the high voltage pulse generator is connected to the input of pulse transformer 19, and the output from the high voltage pulse transformer is connected to the trigger electrode 9 of triggered air gap 14 to cause the air gap to become conductive. The output of the pulse transformer provides a sequence of high voltage pulses in correspondence with the low voltage pulses. Further current transformer $CT_5$ is also coupled to the transmission line and provides input power to battery charger 17 which supplies power to platform battery 16. The platform battery is used to provide power to operate elements 13, 13', and 15. The elements of the series capacitor bypass circuit depicted within FIG. 2 are located within separate and complete enclosures which in turn are supported upon a raised platform 20. The raised platform is electrically isolated from ground by means of a plurality of insulating columns 21.

Figure 3:
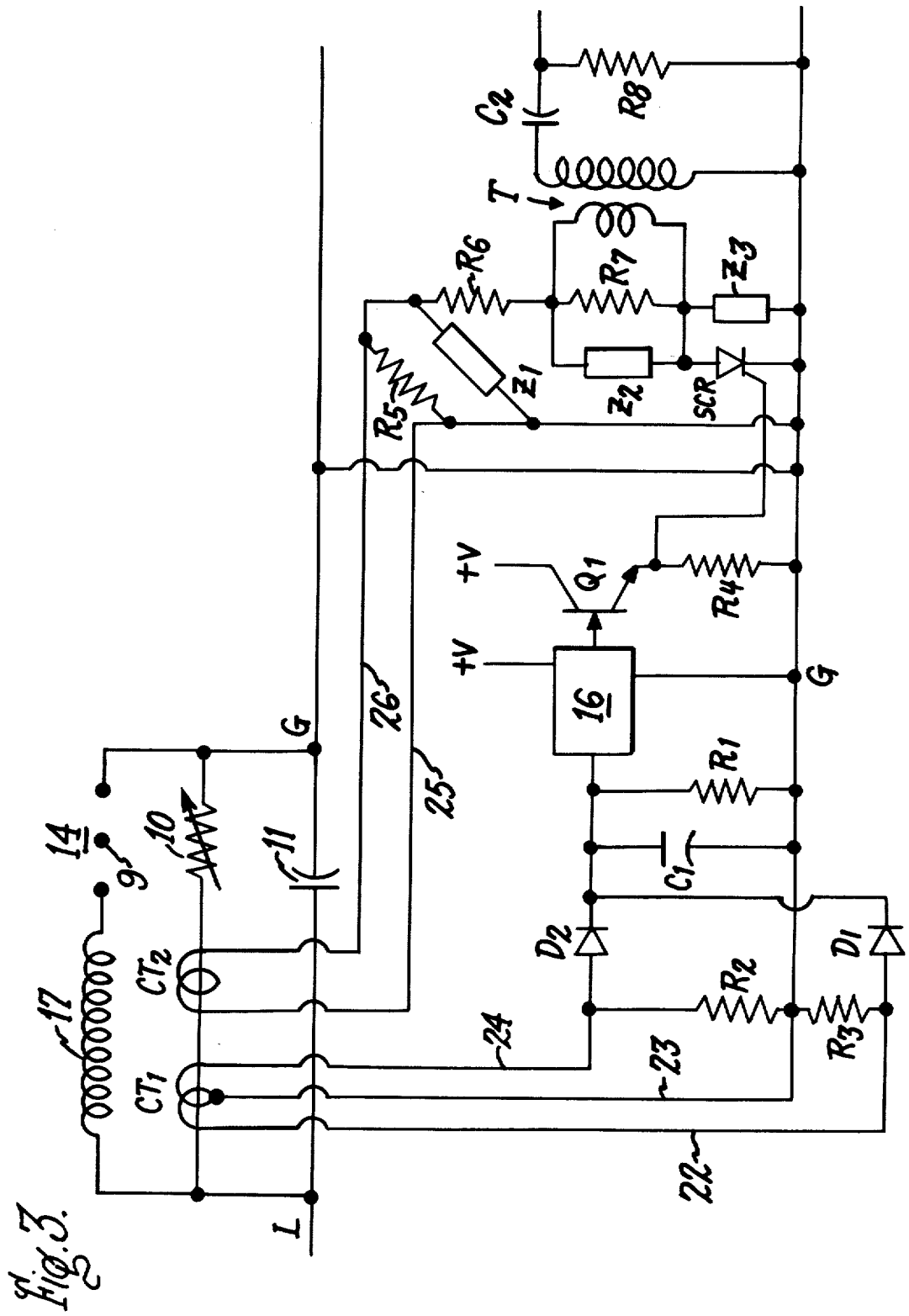
FIG. 3 is a circuit representation of the thermal analog and low voltage pulse generator according to the invention.

FIG. 3 shows the TA circuit of FIGS. 1 and 2 in greater detail. $CT_1$ is connected by line 22 to the anode of a first diode $D_1$ for rectifying one-half of the output from current transformer $CT_1$. Line 24 connects between a second diode $D_2$ and current transformer $CT_1$ for rectifying the other half of the current wave of $CT_1$. Line 23 connects the center point of $CT_1$ to a common terminal G. The cathodes of diodes $D_1$, $D_2$, are coupled together and are connected with capacitor $C_1$, resistor $R_1$, and to the input of voltage comparator 16. The other lead of $C_1$ connects to common terminal G. The current flows through diodes $D_1$, $D_2$ and charges capacitor $C_1$. The voltage across capacitor $C_1$ is proportional to the energy dissipated within varistor 10 because the varistor voltage is nearly constant and the current-time integral of the varistor current is proportional to the voltage existing across the capacitor. The proportionally constant is determined by the values selected for components $CT_1$, $C_1$ and varistor 10. This is an important feature of the thermal analog and low pulse generator circuit of the invention.

The thermal recovery of varistor 10 after experiencing a fault condition ("thermal duty") is approximated through the selection of the discharge time constant ($R_1C_1$). The residual voltage existing across capacitor $C_1$ a short time after a fault condition accounts for the fact that the thermal capability of the varistor is reduced when the time between successive fault occurrences is sufficiently short. Resistors $R_2$, $R_3$ electrically coupling between the anodes of diodes $D_1$, $D_2$ and lines 22, 23, 24, provide an electrical path for the output current from $CT_1$ under normal operating conditions when the varistor current is in the order of a few milliamperes. This prevents capacitor $C_1$ from becoming charged under normal operating conditions.

The function of voltage comparator 16 is to compare the voltage existing across capacitor $C_1$ to a predetermined voltage representing the maximum thermal capability of varistor 10. The input impedance of the voltage comparaor is selected at a high enough value to prevent $C_1$ from becoming discharged through the voltage comparator circuit. In the event that the voltage existing across capacitor $C_1$ exceeds a standard reference voltage the output from comparator 16 rises from a low voltage to a higher voltage.

The output from voltage comparator 16 is connected to the base of a transistor $Q_1$. The transistor is biased into a low current state when the output voltage of the comparator is low, and is forced into saturation when the voltage comparator output is high. The emitter of transistor $Q_1$ is connected to one lead of a resistor $R_4$ and the other lead of resistor $R_4$ is connected to common terminal G.

The gate of an SCR is connected to the emitter of $Q_1$ and to $R_4$. When $Q_1$ is off the voltage across $R_4$ is low so that the gate of the SCR is off. When $Q_1$ saturates the voltage across $R_4$ rises to a high enough value to cause the gate of the SCR to operate.

Transistor $Q_1$ can be eliminated when the power output from voltage comparator is sufficient to drive the gate of SCR directly. $CT_2$ is connected by means of lead 25 to common terminal G and by means of lead 26 to one side of a burden resistor $R_5$, one side of non-linear resistive element $Z_1$, and one side of resistor $R_6$. The other side of $Z_1$ and $R_5$ are connected to common terminal G. The other side of resistor $R_6$ is coupled with a second non-linear resistive element $Z_2$, resistor $R_7$ and one side of the low voltage winding of a transformer T. The other ends of non-linear resistor $Z_2$, resistor $R_7$ and the low voltage winding of transformer T are connected together and to the anode of the SCR and one end of non-linear resistor $Z_3$. The cathode of the SCR and the other side of non-linear resistor $Z_3$ are connected to common terminal G.

The mechanism by which the above described circuit detects high rates of rise of energy within varistor 10 and generates low voltage pulses is described as follows. Because the rate at which energy is abosorbed by varistor 10 is proportional to the current through the varistor the rate at which energy is absorbed within the varistor can be determined from the crest magnitude of the varistor current. The varistor current is represented by a voltage which is developed across resistor $R_5$; therefore, the rate at which energy is dissipated in the varistor is represented by the crest voltage magnitude across resistor $R_5$. The magnitude of this voltage is sensed by the resistor combination $R_6$, $R_7$, and non-linear resistor $Z_3$. Non-linear resistor $Z_1$ protects $CT_2$ against excessively high voltage values. When the voltage across resistor $R_5$ is less than the turn-on voltage of non-linear resistor $Z_3$, very little current flows through resistors $R_6$, $R_7$, and non-linear resistor $Z_3$, so that substantially all the voltage across resistor $R_5$ appears across $Z_3$. When the voltage across resistor $R_5$ is greater than the turn-on voltage of non-linear resistor $Z_3$ current flows through resistors $R_6$, $R_7$, and non-linear resistor $Z_3$. The voltage in excess of the turn-on voltage of non-linear $Z_3$ appears across resistors $R_6$, $R_7$, and the relative values of $R_6$ and $R_7$ are adjusted such that the majority of the excess voltage appears across resistor $R_7$. The voltage across resistor $R_7$ however is made small relative to the total voltage across resistor $R_5$ so that small voltage values in excess of the required turn-on voltage of non-linear resistor $Z_3$ will be sufficient to generate the required voltage pulses for transformer T. This increases the sensitivity of the circuit to small fault current increases over a predetermined value. The voltage across resistor $R_7$ is increased by means of transformer T to a value high enough to initiate the operation of the high voltage pulse generator 15. Since the voltage across resistor $R_5$ varies over a wide range, non-linear resistor $Z_2$ is included in order to limit the maximum voltage which may appear across resistor $R_7$ and thereby prevents excessive voltage pulse magnitudes from damaging the high voltage generator circuits. When non-linear resistor $Z_2$ conducts, all the remaining excess voltage appears across resistor $R_6$.

The voltage pulses which appear across the high voltage side of transformer T are in nearly exact electrical phase with the voltage developed across varistor 10. This means that the high voltage pulses developed by the high voltage pulse generator 15 are in electrical phase with the voltage maxima which appear across the triggered air gap. This electrical phase relationship is another important feature of the invention.

One lead of the high voltage winding of transformer T is connected to common terminal G, and to one side of resistor $R_8$. The other side of resistor $R_8$ is connected to one lead of capacitor $C_2$. The other lead of capacitor $C_2$ is connected to the other terminal of the high voltage side of transformer T. Capacitor $C_2$ and resistor $R_8$ form a high-pass filter which shapes the voltage wave which appears across the high voltage winding of Transformer T. The voltage which appears across resistor $R_8$ is the signal that initiates the operation of high-voltage pulse generator 15.

When the SCR is caused to conduct by means of the output from voltage comparator 16 the voltage across non-linear resistor $Z_3$ drops to near zero. This causes current to flow through resistors $R_6$ and $R_7$ when any voltage appears across resistor $R_5$. Voltage pulses therefore appear across the high voltage side of transformer T whenever the SCR is caused to conduct.

Figure 4:
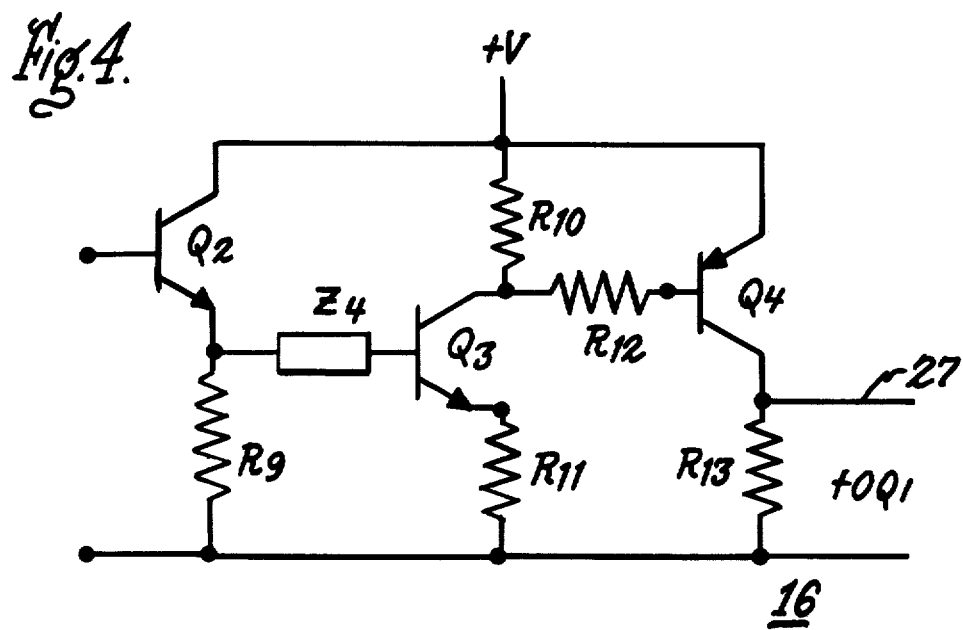
FIG. 4 is a circuit diagram of one type of a voltage comparator circuit for use within the circuit of FIG. 3.

FIG. 4 is one type of a voltage comparator circuit 16 for use within the circuit of FIG. 3. The voltage comparator 16 of FIG. 4 contains a plurality of transistors $Q_2$, $Q_3$, $Q_4$ interconnected by means of a plurality of resistors $R_9$, $R_{10}$, $R_{11}$, $R_{12}$, and $R_{13}$ and at least one non-linear resistor $Z_4$ (i.e. Zener diode) for the purpose of providing an output voltage on line 27 when the predetermined threshold voltage is exceeded. The output voltage comparator 16 is connected to the base of transistor $Q_1$ (FIG. 3) by means of lead 27 and causes transistor $Q_1$ to become operational as described earlier. Although the configuration of transistors, resistors and non-linear resistive element is used for the voltage comparator 16 of FIGS. 3 and 4 it is to be clearly understood that other types of voltage comparator circuits may also be employed.

Although the zinc oxide varistor protective circuit of the invention is disclosed for the purpose of protecting varistors in series capacitor applications on high voltage transmission lines this is by way of example only. The zinc oxide protective circuit of the invention finds application wherever zinc oxide varistors are to be protected.

I claim:

1. A protective circuit for zinc oxide varistors comprising in combination:
   at least one zinc oxide varistor connected within an electric circuit;
   a triggered switching device electrically coupled in shunt relationship with the varistor for bypassing current from the varistor under a condition of varistor overload;
   at least one current sensor electrically connected within the circuit for sensing current flow through said varistor and for generating an electric signal in response to the varistor overload condition, said current sensor being directly connected to an input of a rectifier circuit having an output directly connected to a first capacitor and to a first resistor for generating a voltage across the capacitor which is directly proportional to the energy dissipated within the varistor during said overload condition; and
   pulse generator circuit means for providing a high voltage pulse to the triggered device for causing the triggered device to become conductive when said overload condition occurs.

2. The circuit of claim 1 wherein the rectifier comprises a pair of first and second diodes.

3. The circuit of claim 2 wherein the current sensor comprises at least one current transformer coupled with said first and second diodes and a common terminal within the circuit to provide charging current to said first capacitor.

4. The circuit of claim 1 further including a voltage comparator circuit for comparing the voltage developed across the first capacitor to a reference voltage and for providing an output signal when the voltage across the first capacitor exceeds the reference voltage.

5. The circuit of claim 4 including a gated switch controlled by the output signal of the voltage comparator whereby said switch becomes conductive when the output signal reaches a predetermined value.

6. The circuit of claim 5, including an amplifier for increasing the output signal power to a level sufficient to operate said switch.

7. The circuit of claim 6 wherein the switch comprises a silicon controlled rectifier.

8. The circuit of claim 5 further including a first transistor amplifier electrically connected with an output from the voltage comparator and with a gate of the silicon controlled rectifier for providing gating voltage to the silicon controlled rectifier when the output signal from the voltage comparator causes the transistor to become conductive.

9. The circuit of claim 8 further including a second resistor electrically connected between the gate of the silicon controlled rectifier, the cathode of the silicon controlled rectifier, and the common terminal within the circuit for generating a voltage of sufficient value to operate the gate.

10. The circuit of claim 9 further including a third resistor connected between the anode of the first diode and the common terminal and a fourth resistor connected between the anode of the second diode and said common terminal for providing a current path for said first current transformer under normal varistor operation.

11. The circuit of claim 10 further including a transformer having a primary and secondary winding wherein the anode of the silicon controlled rectifier is connected to one lead of the primary for providing a voltage across the primary when the silicon controlled rectifier becomes conductive.

12. A protective circuit for zinc oxide varistors comprising in combination:
   at least one zinc oxide varistor connected within an electric circuit;
   a triggered switching device electrically coupled in shunt relationship with the varistor for bypassing current from the varistor under a condition of varistor overload;
   at least one current sensing means electrically connected within the circuit for generating an electric signal in response to the varistor overload condition;
   pulse generator circuit means for providing a high voltage pulse to the triggered device for causing the triggered device to become conductive;
   an electrical analog circuit having at least one rectifier electrically coupled with a first capacitor for developing voltage across said first capacitor in direct proportion to energy dissipated in the varistor for determining when the varistor overload occurs and for causing the pulse generator circuit to provide the high voltage pulse when the overload occurs, and consisting of a first resistor electrically connected in parallel with the first capacitor for providing an RC circuit to generate an electrical analog of the thermal recovery of the varistor, a second resistor electrically connected between the gate of the silicon controlled rectifier, the cathode of the silicon controlled rectifier, and the common terminal within the circuit for generating a voltage of sufficient value to operate the gate, a third resistor connected between the anode of the first diode and the common terminal and a fourth resistor connected between the anode of the second diode and said common terminal for providing a current path for said first current transformer under normal varistor operation; and a fifth resistor connected in parallel with a second current transformer for generating a voltage across the fifth resistor in proportion to current through the second current transformer, said second current transformer being connected at one end to said common terminal.

13. The circuit of claim 12 further including a sixth resistor, a seventh resistor and a first non-linear resistor connected in series and across the fifth resistor for generating a voltage across the seventh resistor when the voltage across the fifth resistor is higher than a predetermined turn-on voltage for the first non-linear resistor.

14. The circuit of claim 13 further including a second non-linear resistor electrically connected in parallel with the seventh resistor for limiting the magnitude of the voltage across the seventh resistor to a predetermined value.

15. The circuit of claim 14 wherein the seventh resistor is electrically coupled with the primary of the transformer for providing a voltage across the primary.

16. The circuit of claim 13 wherein the resistance value of the sixth resistor is selected to limit the total current flow through the series parallel combination of the second non-linear resistor, the seventh resistor, the silicon controlled rectifier and the first non-linear resistor to a predetermined value.

17. The circuit of claim 16 further including a third non-linear resistor in parallel with the fifth resistor to limit the total voltage developed across the fifth resistor to a predetermined value.

18. The circuit of claim 17 wherein the secondary winding of the transformer is connected to the high voltage pulse generator input for causing the high voltage pulse generator to deliver a high voltage pulse to the trigger electrode when a voltage appears across the seventh resistor.

19. The circuit of claim 18 wherein the trigger gap device further includes a pair of main gap electrodes and wherein high voltage pulse at the trigger electrode is caused to be in electrical phase with the crest voltages appearing across the main gap electrodes.

20. The circuit of claim 18 further including a second capacitor and an eighth resistor connected in series and across the transformer secondary for decreasing the pulse width of the signal applied to the high voltage pulse generator input.

21. A control circuit for eliminating varistor overload comprising:
at least one current transformer for sensing the varistor current and for charging a capacitor through at least one diode and having a voltage value in proportion to energy dissipated within the varistor;
a voltage comparator for comparing the capacitor voltage to a reference voltage and for causing a silicon controlled rectifier to conduct whereby voltage signals are transmitted to a high voltage pulse generator to operate a triggered air gap connected across the varistor.

* * * * *